(12) United States Patent
Bull et al.

(10) Patent No.: US 11,333,011 B1
(45) Date of Patent: May 17, 2022

(54) SIMULTANEOUS FRACTURING HIGH-PRESSURE LINES

(71) Applicant: Halliburton Energy Services, Inc., Houston, TX (US)

(72) Inventors: Brad Robert Bull, Duncan, OK (US); Timothy Holiman Hunter, Duncan, OK (US); George Melton, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/122,754

(22) Filed: Dec. 15, 2020

(51) Int. Cl.
*E21B 43/26* (2006.01)
*F16L 3/16* (2006.01)

(52) U.S. Cl.
CPC .......... *E21B 43/2607* (2020.05); *E21B 43/26* (2013.01); *F16L 3/16* (2013.01)

(58) Field of Classification Search
CPC ......... E21B 43/2607; E21B 43/26; F16L 3/16
See application file for complete search history.

(56) References Cited

U.S. PATENT DOCUMENTS

| | | | |
|---|---|---|---|
| 7,841,394 B2 | 11/2010 | McNeel et al. | |
| 9,004,104 B2* | 4/2015 | Ungchusri | F16L 41/18 |
| | | | 137/615 |
| 2012/0060929 A1* | 3/2012 | Kendrick | F04D 29/4293 |
| | | | 137/1 |
| 2017/0122060 A1* | 5/2017 | Dille | B60P 3/2205 |
| 2019/0233275 A1 | 8/2019 | Carr et al. | |
| 2019/0383125 A1* | 12/2019 | Koricanek | E21B 43/26 |

FOREIGN PATENT DOCUMENTS

| | | |
|---|---|---|
| WO | 2020046264 A1 | 3/2020 |
| WO | 2020106290 A1 | 5/2020 |
| WO | 2020145978 A1 | 7/2020 |
| WO | 2020145979 A1 | 7/2020 |
| WO | WO-2021003178 A1 * | 1/2021 ......... E21B 43/2607 |

* cited by examiner

*Primary Examiner* — James G Sayre
(74) *Attorney, Agent, or Firm* — Conley Rose, P.C.; Rodney B. Carroll

(57) ABSTRACT

The disclosure provides a manifold comprising a trailer and a piping system. The piping system is disposed on top of the trailer, wherein the piping system comprises a low-pressure system and a high-pressure system. The low-pressure system comprises a first set of conduits and a second set of conduits. The high-pressure system comprises a first conduit line disposed at a first side of the trailer, a second conduit line disposed at a second side of the trailer, wherein the second conduit line is fluidly isolated from the first conduit line, and a plurality of arms disposed along each of the first conduit line and the second conduit line.

18 Claims, 4 Drawing Sheets

US 11,333,011 B1

SIMULTANEOUS FRACTURING HIGH-PRESSURE LINES

TECHNICAL FIELD OF THE INVENTION

The present disclosure relates generally to well operations and, more particularly, to systems and methods for simultaneously treating multiple wells from a central location.

BACKGROUND

In the production of oil and gas in the field, it is often required to stimulate and treat several well locations within a designated amount of time. Stimulation and treatment processes often involve mobile equipment that is set up at a pad location and is then moved by truck from pad to pad within short time periods. Often the conduit in a manifold provides for pressure equalization of fluids prior to injection, but this can be problematic when injecting into multiple wells.

Figure 1:
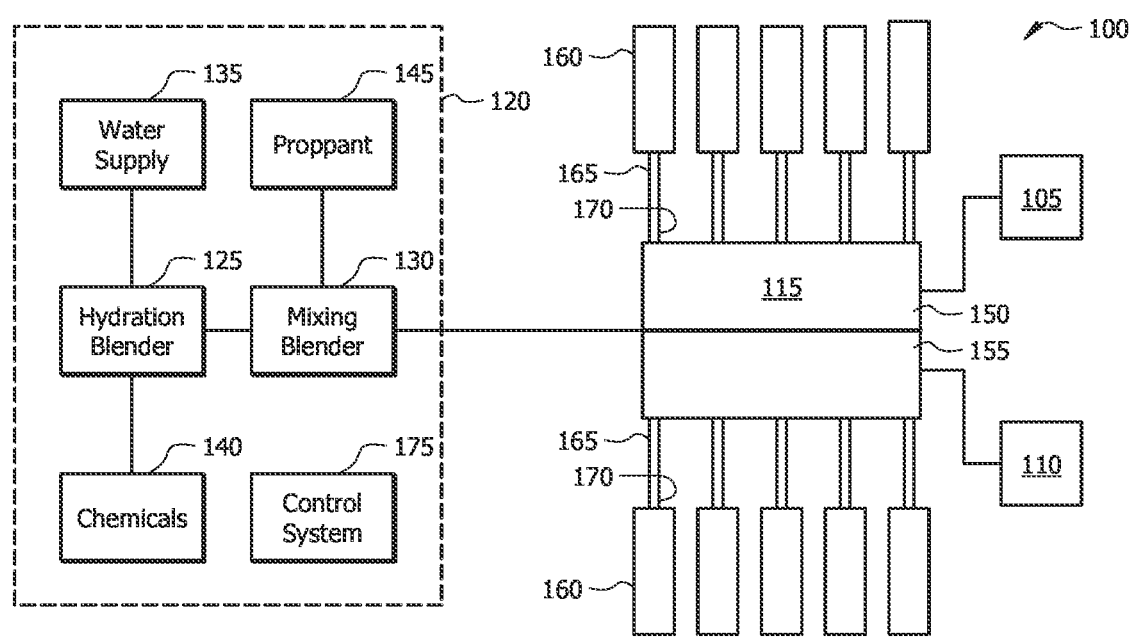
FIG. 1 is a schematic diagram of an example centralized well treatment facility, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments described below with respect to one implementation are not intended to be limiting.

The terms "couple" or "couples," as used herein, are intended to mean either an indirect or direct connection. Thus, if a first device couples to a second device, that connection may be through a direct connection, or through an indirect electrical connection or a shaft coupling via other devices and connections.

Simultaneous well stimulation and treatment processes from a centralized location can simplify logistics and reduce operation time and costs. In some applications, a single fracturing crew or fleet can increase their productivity by fracturing multiple wells from a centralized location without the need for additional blending equipment or personnel. The present disclosure provides for systems and methods for an improved manifold for fracturing operations. The provided systems and methods may be able provide for simultaneous fracturing with a piping system capable of isolated, high-pressure flow.

FIG. 1 illustrates an example of a centralized well treatment facility 100 that can employ the principles of the present disclosure. Multiple wells, such as a first well 105 and a second well 110 may be treated or stimulated simultaneously using the centralized well treatment facility 100. The well treatment facility 100 may be set upon a pad from which at least the first well 105 and the second well 110 may be serviced. In some embodiments, the well treatment facility 100 may be connected to at least the first well 105 and the second well 110 via a central manifold 115. Connections within the well treatment facility 100 may be a standard piping or tubing known to one of ordinary skill in the art. The well treatment facility 100 may include a centralized location 120 that includes at least some of the components of the well treatment facility 100 and may be open, or may be at least partially enclosed with various combinations of structures including a supported fabric structure, a collapsible structure, a prefabricated structure, a retractable structure, a composite structure, a temporary building, a prefabricated wall and roof unit, a deployable structure, a modular structure, a preformed structure, or a mobile accommodation unit.

Advantageously, the well treatment facility 100 may allow for fluids for treatment, stimulation, fracturing, or other well operations to be manufactured, formed and/or mixed at the centralized location 120 prior to being transferred to the first well 105 and the second well 110. In some embodiments, well fluids can be created by optionally mixing constituents in a hydration blender 125 before mixing the fluid in a mixing blender 130. In some embodiments, water from a water supply 135 and dry powder may be introduced into the hydration blender 125. Dry powder, such as guar may be metered into the hydration blender 125 from a storage tank via a screw conveyor. In some embodiments, various chemical additives and modifiers may be introduced into the hydration blender 125 from a chemical storage system 140.

In some embodiments, the chemical storage system 140 is connected to the hydration blender 125 and may include tanks for breakers, gel additives, crosslinkers, and liquid gel concentrate. The tanks may have level control systems such as a wireless hydrostatic pressure system and may be insulated and heated. Pressurized tanks may be used to provide positive pressure displacement to move chemicals, and some tanks may be agitated and circulated. The chemical storage system 140 may continuously meter chemicals with additive pumps, which are able to meter chemical solutions to the hydration blender 125 at specified rates as determined by the required final concentrations and the pump rates of the main treatment fluid from the hydration blender 125. In some embodiments, chemical storage tanks of the chemical storage system 140 are pressurized to drive fluid flow. The quantities and rates of chemicals added to the main fluid stream may be controlled by valve-metering control systems. In addition, chemical additives may be added to the main treatment fluid in the hydration blender 125 via aspiration. The rates that the chemical additives are aspirated into the main fluid stream may be controlled via adjustable, calibrated apertures located between the chemical storage system 140 and the hydration blender 125. In some embodiments, the components of the chemical storage system 140 are modularized allowing pumps, tanks, or blenders to be added or removed independently.

After pre-mixing in the hydration blender 125, the treatment or fracturing fluid may be further mixed in the mixing blender 130. In some embodiments, mixing can occur solely in the mixing blender 130 without any pre-mixing in the hydration blender 125. In some embodiments, the mixing blender 130 may be utilized to introduce, mix and blend proppant and chemical additives into a base fluid. Mixing can be accomplished at downhole pump rates. In some embodiments, the mixing blender 130 is configured to blend proppant and chemical additives into the base fluid without destroying the base fluid properties while still providing ample energy for the blending of proppant into a near fully hydrated fracturing fluid.

Proppant may be introduced into the mixing blender 130 from a proppant storage system 145. In some embodiments, the proppant storage system 145 may include automatic valves and a set of tanks that contain proppant. Each tank can be monitored for level, material weight, and the rate at which proppant is being consumed. This information may be transmitted to a controller or control area. Each tank is capable of being filled pneumatically and may be emptied through a calibrated gravity discharge. Tanks may be added to or removed from the proppant storage system 145 as needed. Empty storage tanks may be replenished as full or partially full tanks are being used, allowing for continuous operation. The tanks may be arranged around a calibrated v-belt conveyor. In addition, a resin-coated proppant may be used by the addition of a mechanical proppant coating system.

In some embodiments, the mixed or manufactured fluid from the mixing blender 130 may be pumped simultaneously to the first well 105 and the second well 110 via the central manifold 115. In some embodiments, the central manifold 115 may be isolated into a first isolated manifold path 150 directed to the first well 105 and a second isolated manifold path 155 directed to the second well 110. The first isolated manifold path 150 and the second isolated manifold path 155 may be integrated in a single, central manifold 115. The use of the central manifold 115 may allow for multiple wells to be fractured or treated simultaneously.

Treatment or fracturing fluid may be transferred, transported, and/or pressurized within the first isolated manifold path 150 and the second isolated manifold path 155 via an array of pumps 160. The array of pumps 160 may be fluidly connected to the first isolated manifold path 150 via suction lines 165 and discharge lines 170. A separate array of pumps 160 may be fluidly connected to the second isolated manifold path 155 via suction lines 165 and discharge lines 170. The pumps 160 within the arrays may be electric, gas, diesel, or natural gas powered. In some embodiments, the pumps 160 may be modularized for ease of configuration. In some embodiments, the output and pressure of the pumps 160 may be adjusted in response to sensor data, such as data received from a flow meter.

As treatment or fracturing fluid flows from the centralized location 120 to the first well 105 and the second well 110 via the central manifold 115, a flow meter may be in fluid communication with the first isolated manifold path 150 and/or with the second isolated manifold path 155 to provide an operator and/or a control system 175 with flow rate and total flow information. The flow meter may provide flow information about each flow to the first well 105 and the second well 110 for precise measurement and regulation. Flow measurements for the first well 105 and the second well 110 may allow for enhanced control of treatment or fracturing of both the first well 105 and the second well 110 while allowing for the benefits of a centralized well treatment facility 100 as described herein. Without limitations, the flow meter can be any suitable type of flow meter, including, but not limited to an orifice plate, Pitot tube, averaging Pitot tube, flume, weir, turbine, target, positive displacement, rotameter, vortex, Coriolis, ultrasonic, magnetic, wedge, v-cone, flow nozzle, and/or Venturi type flow meters. The flow meter can be utilized to measure mass and/or volumetric flow rates of the fluid. Information from the flow meter can be transmitted to a display and/or to the control system 175.

In some embodiments, the operations of the chemical storage system 140, hydration blender 125, proppant storage system 145, mixing blender 130, manifold 115, and/or pumps 160 are controlled, coordinated, and monitored by the central control system 175. The central control system 175 may utilize sensor data as well as operating parameters from the chemical storage system 140, hydration blender 125, proppant storage system 145, mixing blender 130, manifold 115, and pumps 160 to identify operation of the well treatment facility 100. In some embodiments, the control system 175 may be utilized to adjust the output of the pumps 160 by utilizing flow data in light of fluid flow targets for the first well 105 and/or the second well 110. In some embodiments, fluid flow to the first well 105 and/or the second well 110 may be exclusively controlled by adjusting the output of the pumps 160. Further, information from a flow meter can be utilized to control desired fluid properties such as density, rate, viscosity, etc. Flow information can also be utilized to identify dynamic or steady state bottlenecks within the well treatment facility 100. The central control system 175 may also be used to monitor equipment health and status. In one or more embodiments, the central control system 175 may be disposed about any suitable location in the well treatment facility 100. In alternate embodiments, central control system 175 may be located remotely from the well treatment facility 100. The central control system 175 may be directly or indirectly coupled to any one or more components of the well treatment facility 100.

Figure 2:
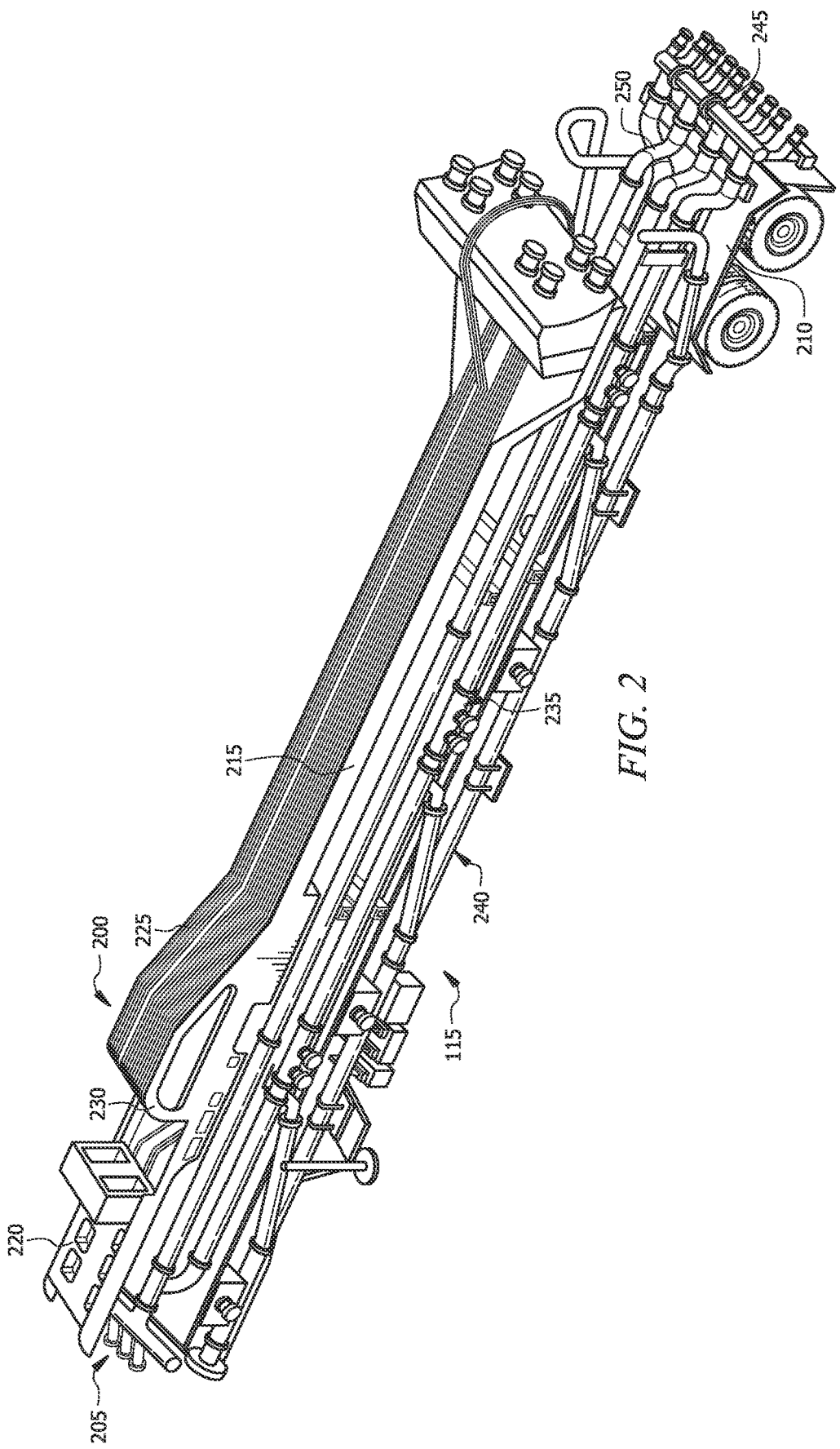
FIG. 2 is a diagram illustrating an example manifold, according to aspects of the present disclosure.

FIG. 2 illustrates an isometric view of the manifold 115. In one or more embodiments, the manifold 115 may comprise a cable transport assembly 200, a piping system 205, and a trailer 210. The cable transport assembly 200 may be configured to contain and/or store electrical cabling and components for the manifold 115. The cable transport assembly 200 may be comprised of metal or steel. As would be understood by one of ordinary skill in the art, in certain embodiments, other materials may be appropriate so long as the material chosen is adequately durable to support the weight of the cables of which it is intended. In certain embodiments, cable transport assembly 200 may be approximately 48 feet (14.63 m) long and approximately 8.5 feet (2.59 m) wide. However, as would be understood by one of ordinary skill in the art, the dimensions of cable transport assembly 200 may be varied based on one or more factors, e.g., the dimensions of the trailer 210, the length, size, or rating of the cables, etc. For example, in certain embodiments, cable transport assembly 200 may be from about 20 feet (6.10 m) long to about 100 (30.48 m) feet long. In certain embodiments, cable transport assembly 200 may be from about 4 feet (1.22 m) wide to about 20 feet (6.10 m) wide.

Cable transport assembly 200 may comprise a frame 215. Frame 215 may comprise one or more supports 220. As would be understood by one of ordinary skill in the art, any number of supports 220 may be appropriate in keeping with aspects of the present disclosure. Supports 220 may provide physical, structural support to one or more cables 225 housed within the cable transport assembly 200 and facilitate easier placement and lifting of the cables 225 into and from the cable transport assembly 200.

Cable transport assembly 200 may further comprise a radial support 230 on an end of the frame 215. In embodiments, there may be a radial support 230 at each end of the frame 215. One or more radial supports 230 may be attachable and removable from frame 215. For example, the radial support 230 may be attached to frame 215 via any suitable fasteners, such that no special tooling is required and for allowing quick installation or removal of the radial support 230 from frame 215.

In embodiments, the one or more cables 225 housed within the cable transport assembly 200 may each comprise an armored outer casing made of rubber to protect the electrical wiring within the casing. Further, the one or more radial supports 230 may provide curved or rounded edges or transitions for the one or more cables 225 such that the one or more cables 225 are not sharply bent or scratched by the frame 215. As would be understood by one of ordinary skill in the art, in certain embodiments, the dimensions and curvature of one or more radial supports 230 may be varied based on one more factors, e.g., the size or rating of the cables 225.

As illustrated, the cable transport assembly 200 may be disposed on top of the piping system 205, wherein the piping system 205 may be disposed on top of the trailer 210. The piping system 205 may be configured to facilitate the flow of one or more fluids to and/or from the manifold 115. In embodiments, the piping system 205 may comprise a low-pressure system 235 and a high-pressure system 240. The low-pressure system 235 may be configured to facilitate the flow of one or more fluids from the centralized location 120 (referring to FIG. 1) to the arrays of pumps 160 (referring to FIG. 1). The high-pressure system 240 may be configured to facilitate the flow of one or more fluids from the arrays of pumps 160 back to the manifold 115. The low-pressure system 235 may comprise of a first set of conduits 245 and a second set of conduits 250. In one or more embodiments, the first set of conduits 245 may be fluidly isolated from the second set of conduits 250. The first set of conduits 245 may be disposed about a first side of the trailer 210, and the second set of conduits 250 may be disposed about a second side of the trailer 210 (i.e., about the width of the trailer 210). In one or more embodiments, the first set of conduits 245 and the second set of conduits 250 may be disposed parallel to the length of the trailer 210.

Figure 3:
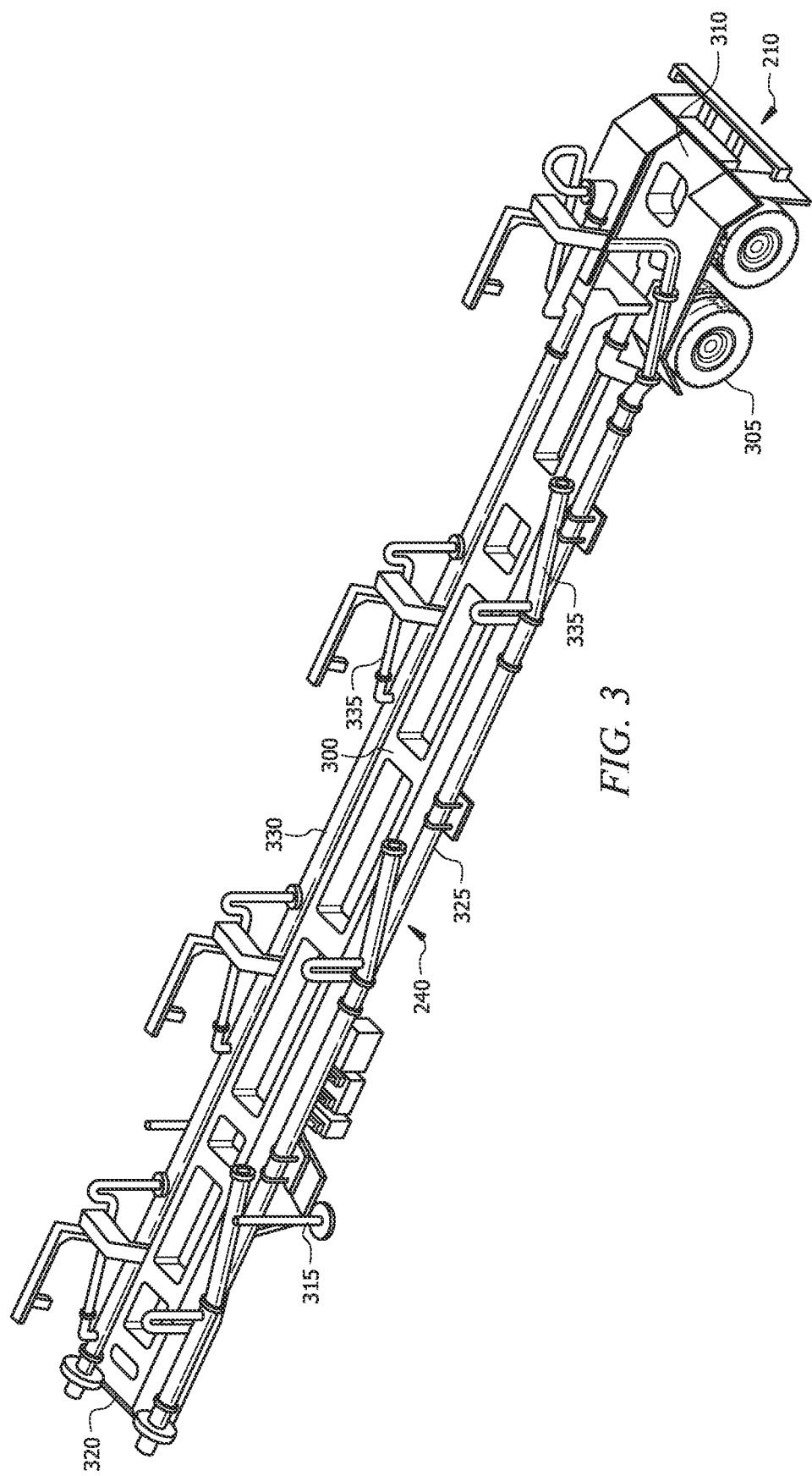
FIG. 3 is a diagram illustrating an example high-pressure system and an example trailer, according to aspects of the present disclosure.

FIG. 3 illustrates an isometric view of the high-pressure system 240 and the trailer 210. In embodiments, the trailer 210 may be configured to transport and support the cable transport assembly 200 (referring to FIG. 2), the piping system 205 (referring to FIG. 2), and other suitable equipment of the manifold 115 (referring to FIG. 1). The trailer 210 may comprise any suitable size, height, shape, and any combinations thereof. In embodiments, the trailer 210 may generally comprise a chassis 300 with a rectangular cross-sectional shape. Further, the trailer 210 may comprise any suitable materials, such as metals, nonmetals, polymers, composites, and any combinations thereof. The chassis 300 may comprise one or more sets of wheels 305 disposed at a first end 310 of the trailer 210 to provide for a means of conveying the trailer 210 from one location to another. There may further be a set of hydraulic supports 315 disposed near a second end 320 of the chassis 300 opposite to the first end 310. In one or more embodiments, the second end 320 of the chassis 300 may be attached to a vehicle (not shown) to be transported. Once the vehicle has transported to a designated location, an operator may detach the chassis 300 from the vehicle and/or may actuate the set of hydraulic supports 315 to physically support the chassis 300 near the second end 320.

As illustrated, the high-pressure system 240 may be disposed on top of the trailer 210. The high-pressure system 240 may be configured to facilitate the flow of one or more fluids from the arrays of pumps 160 (referring to FIG. 1) back to the manifold 115. The high-pressure system 240 may comprise of a first conduit line 325 and a second conduit line 330. In one or more embodiments, the first conduit line 325 may be fluidly isolated from the second conduit line 330. The first conduit line 325 may be disposed about a first side of the trailer 210, and the second conduit line 330 may be disposed about a second side of the trailer 210 (i.e., about the width of the trailer 210). In further embodiments, the first conduit line 325 may be in fluid communication with the first set of conduits 245 (referring to FIG. 2). The second conduit line 330 may be in fluid communication with the second set of conduits 250 (referring to FIG. 2).

In one or more embodiments, the inner diameter of each of the first conduit line 325 and the second conduit line 330 may be from about ½ inches (1.27 cm) to about 2 inches (5.08 cm), from about 2 inches (5.08 cm) to about 5 inches (12.7 cm), and from about 5 inches (12.7 cm) to about 12 inches (30.48 cm). Without limitations, the inner diameter of each of the first conduit line 325 and the second conduit line 330 may be about 7 inches (17.78 cm). In one or more embodiments, each of the first conduit line 325 and the second conduit line 330 may be rated for operation at a pressure of about 1 ksi (6.90 MPa) to about 5 ksi (34.47 MPa), from about 5 ksi (34.37 MPa) to about 10 ksi (68.95 MPa), and from about 10 ksi (68.95 MPa) to about 20 ksi (137.90 MPa). Without limitations, each of the first conduit line 325 and the second conduit line 330 may be rated for operation at a pressure of about 15 ksi (103.42 MPa). In one or more embodiments, each of the first conduit line 325 and the second conduit line 330 may be configured to facilitate a flow rate of about 50 bpm (barrels per minute) to about 75 bpm, from about 75 bpm to about 100 bpm, and from about 100 bpm to about 150 bpm. Without limitations, each of the first conduit line 325 and the second conduit line 330 may be configured to facilitate a flow rate of about 112 bpm.

In one or more embodiments, there may be a plurality of arms 335 disposed along each of the first conduit line 325 and the second conduit line 330. The plurality of arms 335 may be configured to allow for the inflow of one or more fluids into the first conduit line 325 and the second conduit line 330. In embodiments, each of the plurality of arms 335 may be coupled to one of the arrays of pumps 160, wherein each one of the arrays of pumps 160 may be configured to increase the flow rate and/or pressure of one of more fluids flowing through that pump 160. In one or more embodiments, the inner diameter of each of the plurality of arms 335 may be from about ½ inches (1.27 cm) to about 2 inches (5.08 cm), from about 2 inches (5.08 cm) to about 5 inches (12.7 cm), and from about 5 inches (12.7 cm) to about 12 inches (30.48 cm). Without limitations, the inner diameter of each of the plurality of arms 335 may be about 4 inches (10.16 cm). Each of the plurality of arms 335 may be configured to rotate outwards from the trailer 210. In embodiments, each of the plurality of arms 335 may be disposed above the trailer 210 at least parallel to the trailer 210 or pointing inwards in relation to the trailer 210 at a first position. Each of the plurality of arms 335 may be configured to rotate to any suitable degree outwards from the trailer 210, wherein the angle is with respect to a side of the trailer 210. Without limitations, each of the plurality of arms 335 may rotate by a suitable degree within a range of about 5° to about 20°, from about 20° to about 45°, from about 45° to about 90°, and from about 90° to about 180°.

Figure 4:
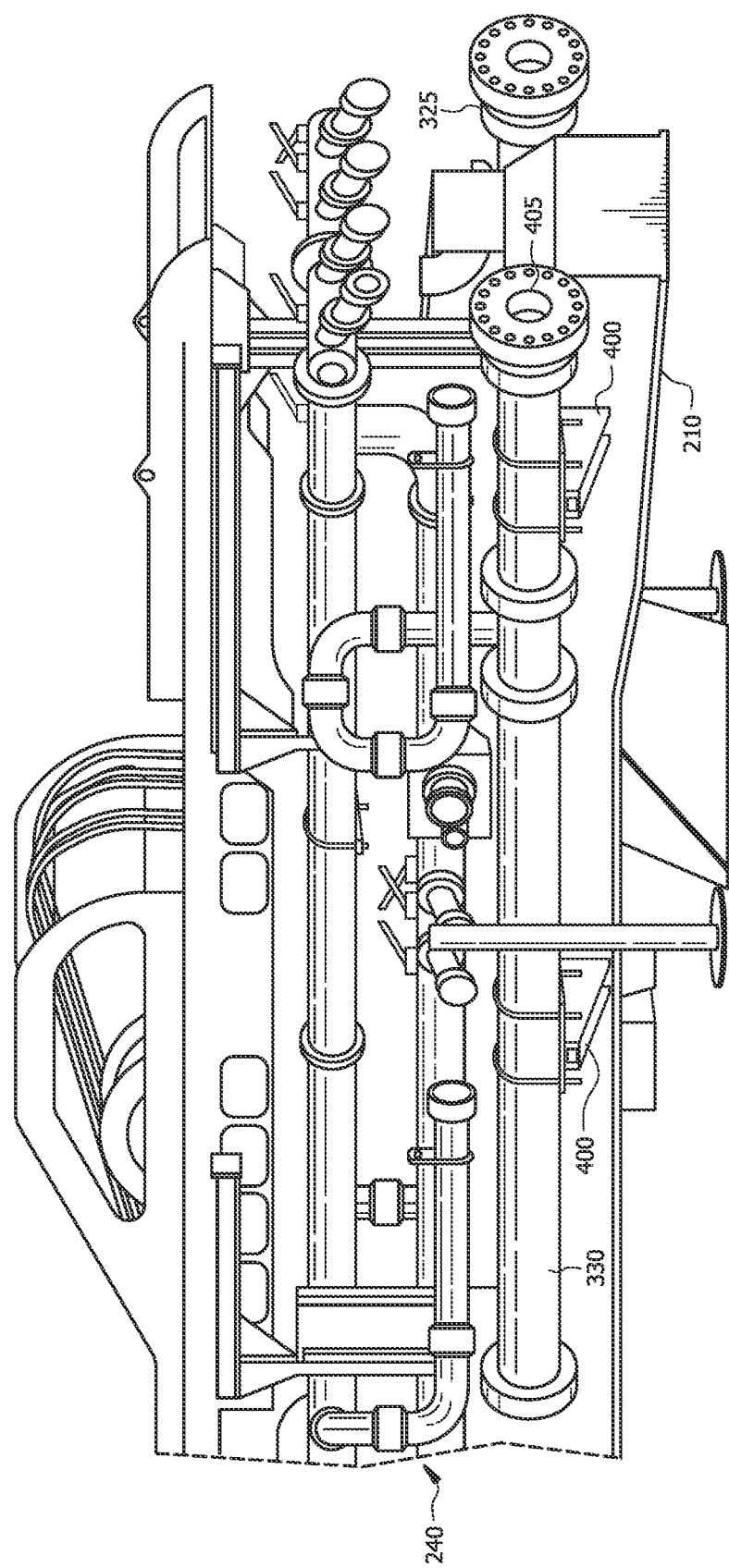
FIG. 4 is a diagram illustrating an example high-pressure system and an example trailer, according to aspects of the present disclosure.

FIG. 4 illustrates an isometric view of the high-pressure system 240 and the trailer 210. As illustrated, there may be a plurality of structural beams 400 disposed along a side of the trailer 210. In embodiments, the plurality of structural beams 400 may be disposed along both sides of the trailer 210. In these embodiments, the location of the plurality of structural beams 400 on one side may be the same as the location of the plurality of structural beams 400 on the other side. The plurality of structural beams 400 may extend outwards from the trailer 210. The plurality of structural beams 400 may be configured to support a load, such as the high-pressure system 240. Without limitations, the plurality of structural beams 400 may be T-beams, double T-beams, I-beams, H-beams, L-beams, channels, and the like. As illustrated, the high-pressure system 240 may be disposed on the plurality of structural beams 400. For each one of the plurality of structural beams 400, any number of suitable fasteners may be used to secure either the first conduit line 325 or the second conduit line 330 of the high-pressure system 240 that structural beam 400. Without limitations, U-bolts, studs, nuts, washers, screws, and the like may be used for each one of the plurality of structural beams 400.

In one or more embodiments, an outlet 405 of each of the first conduit line 325 and the second conduit line 330 may be disposed at the second end 320 of the trailer 210. The outlet 405 may be configured to discharge one or more fluids flowing through the first conduit line 325 and the second conduit line 330 into either the first well 105 (referring to FIG. 1) or the second well 110 (referring to FIG. 1).

With reference to FIGS. 1-4, a method of operating the manifold 115 may be described. With regards to the present disclosure, the manifold 115 may be configured for simultaneous fracturing operations that can provide for pumping one or more fluids downhole into the first well 105 and second well 110. During operations, the low-pressure system 235 may facilitate the flow of one or more fluids from the centralized location 120 to the arrays of pumps 160. The arrays of pumps 160 may increase the flow rate and/or pressure of the one or more fluids and may discharge the one or more fluids to flow back to the manifold 115. In one or more embodiments, the high-pressure system 240 may receive the one or more fluids as the high-pressure system 240 may be directly or indirectly coupled to the arrays of pumps 160. In these embodiments, the plurality of arms 335 may be rotated to be disposed at an angle from each of the first conduit line 325 and the second conduit line 330 in order to better couple with the arrays of pumps 160. In certain embodiments, the plurality of arms 335 may couple to skids (not shown) that are fluidly coupled to each of the pumps 160, wherein the skids may provide for a reduction in time for set-up and therefore cost. As the one or more fluids flow into the plurality of arms 335, the one or more fluids may flow through each of the first conduit line 325 and the second conduit line 330 and out a respective outlet 405, wherein the outlet 405 may direct the flow into either the first well 105 or the second well 110. The present disclosure provides for independent, high-pressure fluid flow into multiple wells, thereby reducing a frac spread footprint and time of operation.

An embodiment of the present disclosure is a manifold comprising: a trailer; and a piping system, wherein the piping system is disposed on top of the trailer, wherein the piping system comprises a low-pressure system and a high-pressure system, wherein the low-pressure system comprises a first set of conduits and a second set of conduits, wherein the high-pressure system comprises: a first conduit line disposed at a first side of the trailer; a second conduit line disposed at a second side of the trailer, wherein the second conduit line is fluidly isolated from the first conduit line; and a plurality of arms disposed along each of the first conduit line and the second conduit line.

In one or more embodiments described in the preceding paragraph, both the first conduit line and the second conduit line are rated for operation at a pressure of about 15 ksi. In one or more embodiments described above, wherein the inner diameter of both the first conduit line and the second conduit line is 7 inches. In one or more embodiments described above, wherein the first conduit line is in fluid communication with the first set of conduits of the low-pressure system. In one or more embodiments described above, wherein the second conduit line is in fluid communication with the second set of conduits of the low-pressure system. In one or more embodiments described above, wherein the inner diameter of each of the plurality of arms is 4 inches. In one or more embodiments described above, wherein an outlet of both the first conduit line and the second conduit line is disposed at an end of the trailer and is configured to discharge one or more fluids.

Another embodiment of the present disclosure is a method of operating a manifold, comprising: actuating a low-pressure system to introduce one or more fluids to an array of pumps, wherein the low-pressure system is disposed on the manifold; actuating the array of pumps to increase the pressure of the one or more fluids; directing the one or more fluids to a high-pressure system disposed on the manifold; and introducing the one or more fluids into a first conduit line of the high-pressure system, a second conduit line of the high-pressure system, or both through a plurality of arms.

In one or more embodiments described in the preceding paragraph, further comprising rotating the plurality of arms to extend outwards from the manifold by a predetermined angle. In one or more embodiments described above, further comprising discharging the one or more fluids from an outlet of the first conduit line into a first well. In one or more embodiments described above, further comprising discharging the one or more fluids from an outlet of the second conduit line into a second well.

A further embodiment of the present disclosure is a well treatment facility, comprising: a first well; a second well; a manifold coupled to the first well and the second well, comprising: a trailer comprising a plurality of structural beams disposed along both sides of the trailer; and a piping system, wherein the piping system is disposed on top of the trailer, wherein the piping system comprises a high-pressure system, wherein the high-pressure system comprises: a first conduit line disposed at a first side of the trailer; a second conduit line disposed at a second side of the trailer, wherein the second conduit line is fluidly isolated from the first conduit line; and a plurality of arms disposed along each of the first conduit line and the second conduit line.

In one or more embodiments described in the preceding paragraph, both the first conduit line and the second conduit line are rated for operation at a pressure of about 15 ksi. In one or more embodiments described above, wherein the inner diameter of both the first conduit line and the second conduit line is 7 inches. In one or more embodiments described above, wherein the piping system comprises a low-pressure system, wherein the low-pressure system comprises a first set of conduits and a second set of conduits. In one or more embodiments described above, wherein the first conduit line is in fluid communication with the first set of conduits of the low-pressure system. In one or more embodiments described above, wherein the second conduit line is in fluid communication with the second set of conduits of the low-pressure system. In one or more embodiments described above, wherein the inner diameter of each of the plurality of arms is 4 inches. In one or more embodiments described above, wherein an outlet of both the first conduit line and the second conduit line is disposed at an end of the trailer and is configured to discharge one or more fluids. In one or more embodiments described above, wherein the high-pressure system is disposed onto the plurality of structural beams and secured through the use of fasteners.

Unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A manifold, comprising:
    a trailer; and
    a piping system, wherein the piping system is disposed on top of the trailer, wherein the piping system comprises a low-pressure system and a high-pressure system, wherein the low-pressure system comprises a first set of conduits and a second set of conduits, wherein the high-pressure system comprises:
        a first conduit line disposed at a first side of the trailer;
        a second conduit line disposed at a second side of the trailer, wherein the second conduit line is fluidly isolated from the first conduit line, wherein the high-pressure system is operable to simultaneously introduce one or more fluids into both a first well through the first conduit line and a second well through the second conduit line; and
        a plurality of arms disposed along each of the first conduit line and the second conduit line.

2. The manifold of claim 1, wherein the inner diameter of both the first conduit line and the second conduit line is 7 inches.

3. The manifold of claim 1, wherein both the first conduit line and the second conduit line are rated for operation at a pressure of about 15 ksi.

4. The manifold of claim 1, wherein the first conduit line is in fluid communication with the first set of conduits of the low-pressure system through an array of pumps, wherein the array of pumps is coupled to both the high-pressure system and the low-pressure system.

5. The manifold of claim 1, wherein the second conduit line is in fluid communication with the second set of conduits of the low-pressure system through an array of pumps, wherein the array of pumps is coupled to both the high-pressure system and the low-pressure system.

6. The manifold of claim 1, wherein the inner diameter of each of the plurality of arms is 4 inches.

7. The manifold of claim 1, wherein an outlet of both the first conduit line and the second conduit line is disposed at an end of the trailer and is configured to discharge one or more fluids.

8. A method of operating a manifold, comprising:
    actuating a low-pressure system to introduce one or more fluids to an array of pumps, wherein the low-pressure system is disposed on the manifold;
    actuating the array of pumps to increase the pressure of the one or more fluids;
    directing the one or more fluids to a high-pressure system disposed on the manifold; and
    introducing the one or more fluids simultaneously into both a first conduit line of the high-pressure system and a second conduit line of the high-pressure system through a plurality of arms;
    discharging the one or more fluids from an outlet of the first conduit line into a first well; and discharging the one or more fluids from an outlet of the second conduit line into a second well.

9. The method of claim 8, further comprising rotating the plurality of arms to extend outwards from the manifold by a predetermined angle.

10. A well treatment facility, comprising:

a first well;

a second well;

a manifold coupled to the first well and the second well, comprising:

a trailer comprising a plurality of structural beams disposed along both sides of the trailer; and a piping system, wherein the piping system is disposed on top of the trailer, wherein the piping system comprises a high-pressure system, wherein the high-pressure system comprises:

a first conduit line disposed at a first side of the trailer;

a second conduit line disposed at a second side of the trailer, wherein the second conduit line is fluidly isolated from the first conduit line, wherein the high-pressure system is operable to simultaneously introduce one or more fluids into both a first well through the first conduit line and a second well through the second conduit line; and a plurality of arms disposed along each of the first conduit line and the second conduit line.

11. The well treatment facility of claim 10, wherein the piping system comprises a low-pressure system, wherein the low-pressure system comprises a first set of conduits and a second set of conduits.

12. The well treatment facility of claim 11, wherein the first conduit line is in fluid communication with the first set of conduits of the low-pressure system through an array of pumps, wherein the array of pumps is coupled to both the high-pressure system and the low-pressure system.

13. The well treatment facility of claim 11, wherein the second conduit line is in fluid communication with the second set of conduits of the low-pressure system through an array of pumps, wherein the array of pumps is coupled to both the high-pressure system and the low-pressure system.

14. The well treatment facility of claim 10, wherein the inner diameter of both the first conduit line and the second conduit line is 7 inches.

15. The well treatment facility of claim 10, wherein both the first conduit line and the second conduit line are rated for operation at a pressure of about 15 ksi.

16. The well treatment facility of claim 10, wherein the inner diameter of each of the plurality of arms is 4 inches.

17. The well treatment facility of claim 10, wherein an outlet of both the first conduit line and the second conduit line is disposed at an end of the trailer and is configured to discharge one or more fluids.

18. The well treatment facility of claim 10, wherein the high-pressure system is disposed onto the plurality of structural beams and secured through the use of fasteners.

* * * * *